US011897258B2

(12) United States Patent
Takahashi

(10) Patent No.: US 11,897,258 B2
(45) Date of Patent: Feb. 13, 2024

(54) PRINTING APPARATUS

(71) Applicant: BROTHER KOGYO KABUSHIKI KAISHA, Nagoya (JP)

(72) Inventor: Hiroaki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/586,513

(22) Filed: Jan. 27, 2022

(65) Prior Publication Data

US 2022/0242149 A1 Aug. 4, 2022

(30) Foreign Application Priority Data

Jan. 29, 2021 (JP) ................................ 2021-013969

(51) Int. Cl.

*B41J 11/70* (2006.01)
*B41J 29/393* (2006.01)
*B41J 11/00* (2006.01)

(52) U.S. Cl.

CPC ............. *B41J 11/70* (2013.01); *B41J 29/393* (2013.01); *B41J 11/007* (2013.01); *B41J 11/0095* (2013.01)

(58) Field of Classification Search

CPC .... B41J 29/393; B41J 11/007; B41J 11/0095; B41J 11/70; B41J 11/663; B41J 11/003; B41J 29/38; B41J 3/60; B41J 11/66; B41J 13/0009

See application file for complete search history.

(56) References Cited

U.S. PATENT DOCUMENTS

2011/0001785 A1* 1/2011 Tsuzawa .................. B41J 15/04
347/104

FOREIGN PATENT DOCUMENTS

JP 2004306304 A * 11/2004
JP 2018-186448 A 11/2018

* cited by examiner

*Primary Examiner* — Jannelle M Lebron

(74) *Attorney, Agent, or Firm* — MERCHANT & GOULD P.C.

(57) ABSTRACT

A printing apparatus includes: a conveyor; a first conveyance path through which a print medium is conveyed in a first conveyance direction; an image recording device; a cutter provided downstream of the image recording device and configured to cut the print medium into a first print medium having a first region and a second print medium having a second region; and a controller configured to cause the printing apparatus to: record an image in the first region; after the recording, cut the print medium into the first and second print medium; after the cutting, discharge the first print medium to an outside; after the discharging, convey the second print medium in a second conveyance direction; and after the conveying, record an image in the second region of the second print medium.

8 Claims, 8 Drawing Sheets

PRINTING APPARATUS

CROSS-REFERENCE TO RELATED APPLICATIONS

This application is based on and claims priority under 35 USC 119 from Japanese Patent Application No. 2021-013969 filed on Jan. 29, 2021, the contents of which are incorporated herein by reference.

TECHNICAL FIELD

The present disclosure relates to a printing apparatus.

BACKGROUND

A related-art image forming apparatus includes a cutter that cuts a sheet being conveyed for printing. In the related-art image forming apparatus, an image is formed on one sheet, then the sheet on which the image is formed is cut by a sheet cutter to generate two sheets, and the generated two sheets are discharged to a discharge tray.

SUMMARY

One illustrative aspect of the present disclosure provides a printing apparatus including: a conveyor configured to convey a print medium; a first conveyance path, the conveyor being configured to convey the print medium through the first conveyance path in a first conveyance direction; an image recording device provided in the first conveyance path, the image recording device being configured to record an image on the print medium; a cutter provided downstream of the image recording device in the first conveyance path, the cutter being configured to cut the print medium into a first print medium and a second print medium at a predetermined cutting position, the first print medium having a first region, the second print medium having a second region; and a controller. The controller is configured to cause the printing apparatus to: record an image in the first region by the image recording device; after the recording, cut the print medium into the first print medium and the second print medium by the cutter; after the cutting, discharge the first print medium to an outside; after the discharging, convey the second print medium in a second conveyance direction by the conveyor, the second conveyance direction being opposite to the first conveyance direction; and after the conveying, record an image in the second region of the second print medium by the image recording device.

According thereto, the printing apparatus can be provided in which the time required from when the image is started to be recorded on the print medium in the image recording device to when the first sheet of the print medium among print media obtained by being cut by the cutter is discharged can be shorted, and the same print quality as the print quality of the first sheet of the print medium can be maintained for the second and subsequent print media among the print media obtained by the cutting.

BRIEF DESCRIPTION OF DRAWINGS

Illustrative embodiments of the disclosure will be described in detail based on the following figures, wherein.

DETAILED DESCRIPTION

In the above-described related-art image forming apparatus, however, the sheet cutter is provided downstream of an image recording device in a conveyance direction.

Therefore, illustrative aspects of the present disclosure provide a printing apparatus in which, even a cutter is provided downstream of an image recording device in a conveyance direction, a time required from when an image is started to be recorded on a print medium in the image recording device to when a first sheet of the print medium among print media obtained by being cut by the cutter is discharged can be shorted, and the same print quality as a print quality of a first sheet of the print medium can be maintained for a second and subsequent print media among the print media obtained by the cutting.

First Illustrative Embodiment

Hereinafter, a first illustrative embodiment of the present disclosure will be described in detail.

Configuration of Printing Apparatus

Figure 1:
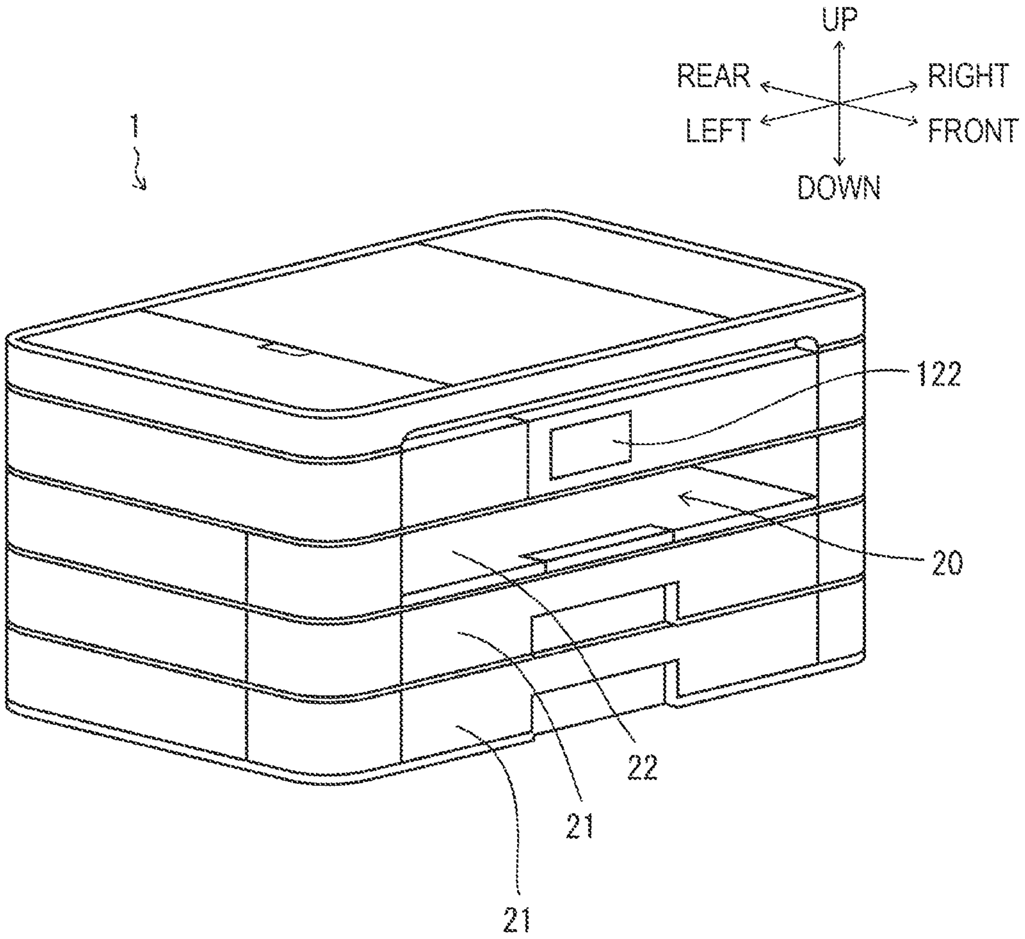
FIG. 1 is a diagram showing an external appearance of a printing apparatus according to the present disclosure.
Figure 2:
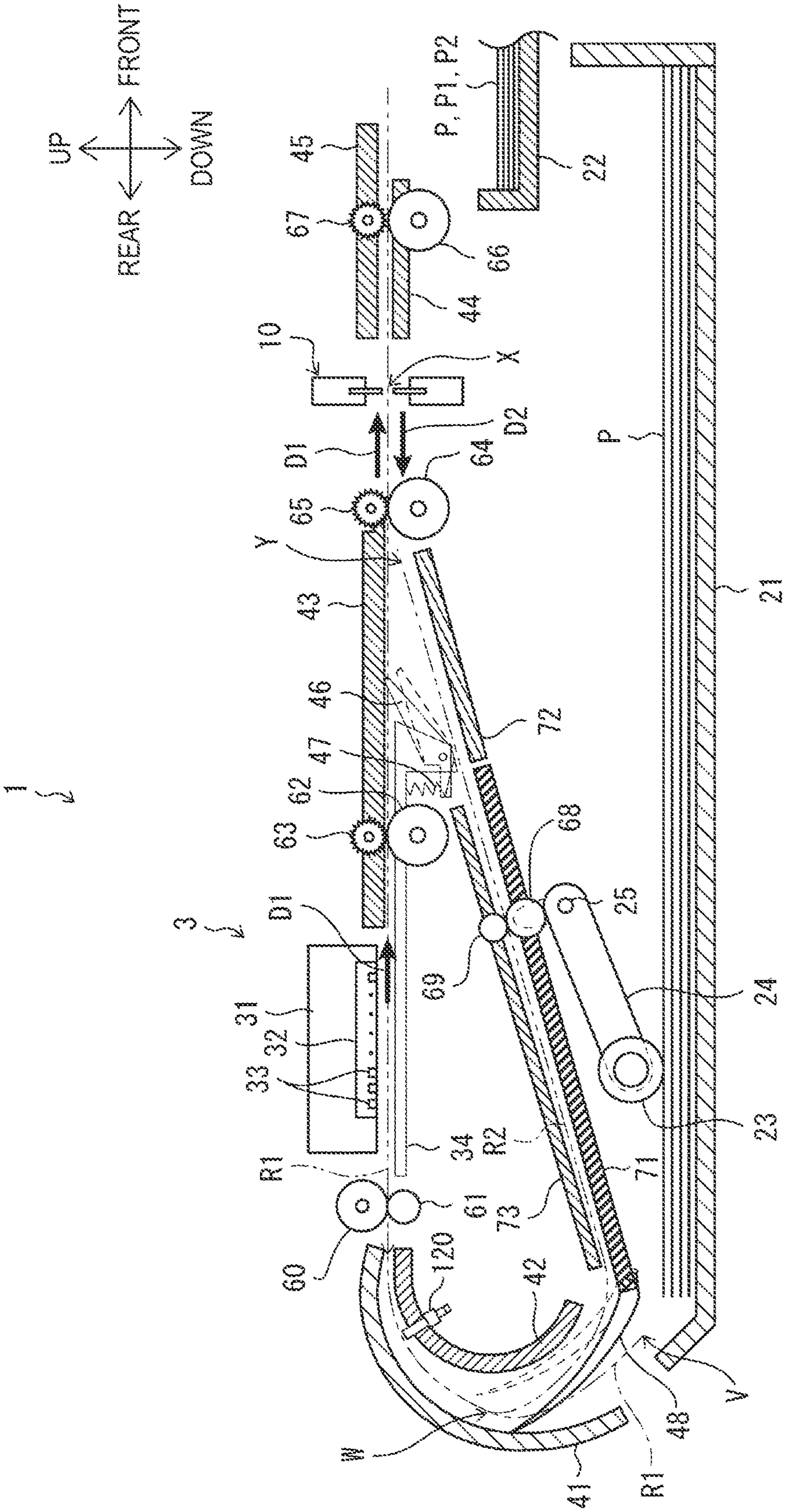
FIG. 2 is a cross-sectional view showing an internal structure of the printing apparatus according to the present disclosure.

FIG. 1 is a diagram showing an external appearance of a printing apparatus 1. FIG. 2 is a cross-sectional view showing an internal structure of the printing apparatus 1. A printing apparatus 1 shown in FIG. 1 is a multi-function peripheral (MFP) having a plurality of functions such as a print function, a scan function, a copy function, and a facsimile function. For convenience of explanation, as indicated by arrows in FIG. 1, an up-down direction, a left-right direction, and a front-rear direction of the printing apparatus 1 are defined.

The printing apparatus 1 has the print function of an ink jet system in which print data designated by a print job is recorded, by, for example, ejecting ink, on a sheet P serving as an example of a print medium of the present prevent. An image printed on the sheet P may be capable of color printing or may be only for monochrome printing. Further, the sheet P is not limited to a paper medium, and may be a resin medium such as a transparency sheet.

As shown in FIG. 1, an opening 20 is formed in a front surface of the printing apparatus 1. Feed trays 21 serving as an example of an accommodation portion, and a discharge tray 22 serving as an example of a discharge portion, are detachably disposed in the opening 20. The feed trays 21 are trays for storing a plurality of sheets P, and upper surfaces of the feed trays 21 are open. In an example shown in FIG. 1, the two feed trays 21 are arranged side by side in the up-down direction. For example, the sheet P of A4 size is accommodated in the upper feed tray 21. Meanwhile, for example, the sheet P of A3 size is accommodated in the lower feed tray 21.

As shown in FIG. 2, the discharge tray 22 is disposed above the upper feed tray 21. The discharge tray 22 is a tray for accommodating the sheet P, a first sheet P1, and a second sheet P2 discharged by a conveyance roller 66, and a top surface of the discharge tray 22 is open. In an example shown in FIG. 2, the lower feed tray 21 is not shown for convenience of description.

Further, as shown in FIG. 1, a setting interface 122 including a display screen is provided in the front surface of the printing apparatus 1. The setting interface 122 includes, for example, a touch panel, and various settings related to printing of the printing apparatus 1 can be performed by a touch operation of a user. The setting interface 122 receives settings of a size of the sheet P and whether to perform cutting processing. Information set with the setting interface 122 is output to a controller 100 (see FIG. 3).

As shown in FIG. 2, the printing apparatus 1 includes a feed roller 23, a first conveyance path R1, conveyance rollers 60, 62, 64, 66, and 68, a first flap 46, a second flap 48, a second conveyance path R2, and a cutter 10. Here, the conveyance rollers 60, 62, 64, and 66 serve as an example of a first conveyor. Further, the conveyance rollers 64, 66, and 68 serve as an example of a second conveyor. The number of rollers provided in the first conveyance path R1 and the second conveyance path R2 can be changed as appropriate, and for example, the conveyance roller 66 may not be provided.

The feed roller 23 is a roller for feeding the sheet P accommodated in the feed tray 21 to a conveyance start position V of the first conveyance path R1. The feed roller 23 is rotatably supported by a front end portion of a feed arm 24. The feed arm 24 is rotatably supported by a shaft 25 supported by a frame of the printing apparatus 1. The feed roller 23 rotates forward when a feed motor 107 (see FIG. 3) is driven. When the feed roller 23 rotates forward, the sheet P accommodated in the feed tray 21 is fed one by one to the conveyance start position V of the first conveyance path R1.

The first conveyance path R1 extends upward from a trailing end portion of the feed tray 21, is curved in a region defined by guide members 41 and 42, passes through a position of an image recording device 3, extends linearly in a region defined by guide members 43, 44, and 45, and reaches the discharge tray 22. In the first illustrative embodiment, a first conveyance direction D1 is a direction in which the sheet P passes through a cutting position X when the image is recorded on the sheet P by the image recording device 3, that is, a direction from the image recording device 3 toward the cutting position X. Further, a second conveyance direction D2 is a conveyance direction of the sheet P opposite to the first conveyance direction D1.

The conveyance roller 60 is disposed upstream of the image recording device 3 in the first conveyance direction D1 in the first conveyance path R1. A pinch roller 61 is disposed at a position facing a lower portion of the conveyance roller 60. The conveyance roller 60 is driven by a conveyance motor 108 (see FIG. 3). The pinch roller 61 rotates in accordance with rotation of the conveyance roller 60. When the conveyance roller 60 and the pinch roller 61 rotate forward, the sheet P is nipped by the conveyance roller 60 and the pinch roller 61 and conveyed to the image recording device 3.

The image recording device 3 is provided between the conveyance roller 60 and the conveyance roller 62 in the first conveyance path R1, and records the image on the sheet P. The image recording device 3 includes a carriage 31, a recording head 32, nozzles 33, and a platen 34. The recording head 32 is mounted in the carriage 31. A plurality of nozzles 33 are provided on a lower surface of the recording head 32. The recording head 32 ejects ink droplets from the nozzles 33. The platen 34 is a rectangular plate-shaped member on which the sheet P is placed. During the carriage 31 moves with respect to the sheet P supported by the platen 34, the nozzles 33 selectively eject the ink droplets on the sheet P, whereby the image is recorded on the sheet P.

The carriage 31 is reciprocated in a direction perpendicular to the first conveyance direction D1, that is, in a width direction of the sheet P, by a driving force of a carriage motor 109 (see FIG. 3) being transmitted to the carriage 31. The image is recorded on the sheet P by the controller 100 repeating recording processing of causing the nozzles 33 to eject the ink while moving the carriage 31 in the width direction of the sheet P in a state where the conveyance of the sheet P is stopped and recording the image of one line on the sheet P, and line feed processing of driving the conveyance rollers 60 and 62 to convey the sheet P by a predetermined line feed amount.

As shown in FIG. 2, the conveyance roller 62 is disposed downstream of the image recording device 3 in the first conveyance direction D1 in the first conveyance path R1. A spur roller 63 is disposed at a position facing an upper portion of the conveyance roller 62. The conveyance roller 62 is driven by the conveyance motor 108 (see FIG. 3). The spur roller 63 rotates in accordance with rotation of the conveyance roller 62. When the conveyance roller 62 and the spur roller 63 rotate forward, the sheet P is nipped by the conveyance roller 62 and the spur roller 63 and conveyed to a downstream side in the first conveyance direction D1.

Further, the conveyance roller 64 is disposed downstream of the conveyance roller 62 in the first conveyance direction D1 in the first conveyance path R1. A spur roller 65 is disposed at a position facing an upper portion of the conveyance roller 64. The conveyance roller 64 is driven by the conveyance motor 108. The spur roller 65 rotates in accordance with rotation of the conveyance roller 64. When the conveyance roller 64 and the spur roller 65 rotate forward, the sheet P is nipped by the conveyance roller 64 and the spur roller 65, and conveyed toward a cutter 10 side. On the other hand, when the conveyance roller 64 and the spur roller 65 rotate backward, the sheet P is nipped by the conveyance roller 64 and the spur roller 65, and is conveyed to the second conveyance path R2 along a lower surface of the first flap 46.

The first flap 46 is provided between the conveyance roller 62 and the conveyance roller 64 in the first conveyance path R1. The first flap 46 is disposed in the vicinity of a branching position Y facing the guide member 43. The first flap 46 is rotatably supported by the platen 34 between a first state and a second state. In the first state indicated by a solid line in FIG. 2, the first flap 46 comes into contact with the guide member 43 to close the first conveyance path R1. On the other hand, in the second state indicated by a dotted line in FIG. 2, the first flap 46 is located below a position at which the first flap 46 is disposed in the first state to separate from the guide member 43, which causes the sheet P conveyed in the first conveyance direction D1 to pass.

The first flap 46 is biased upward by a coil spring 47. One end of the coil spring 47 is connected to the first flap 46, and the other end of the coil spring 47 is connected to the platen

34. The first flap 46 is in the first state by being biased by the coil spring 47, and a front end of the first flap 46 comes into contact with the guide member 43.

The cutter 10 is disposed between the conveyance roller 64 and the conveyance roller 66 in the first conveyance path R1.

Figure 4:
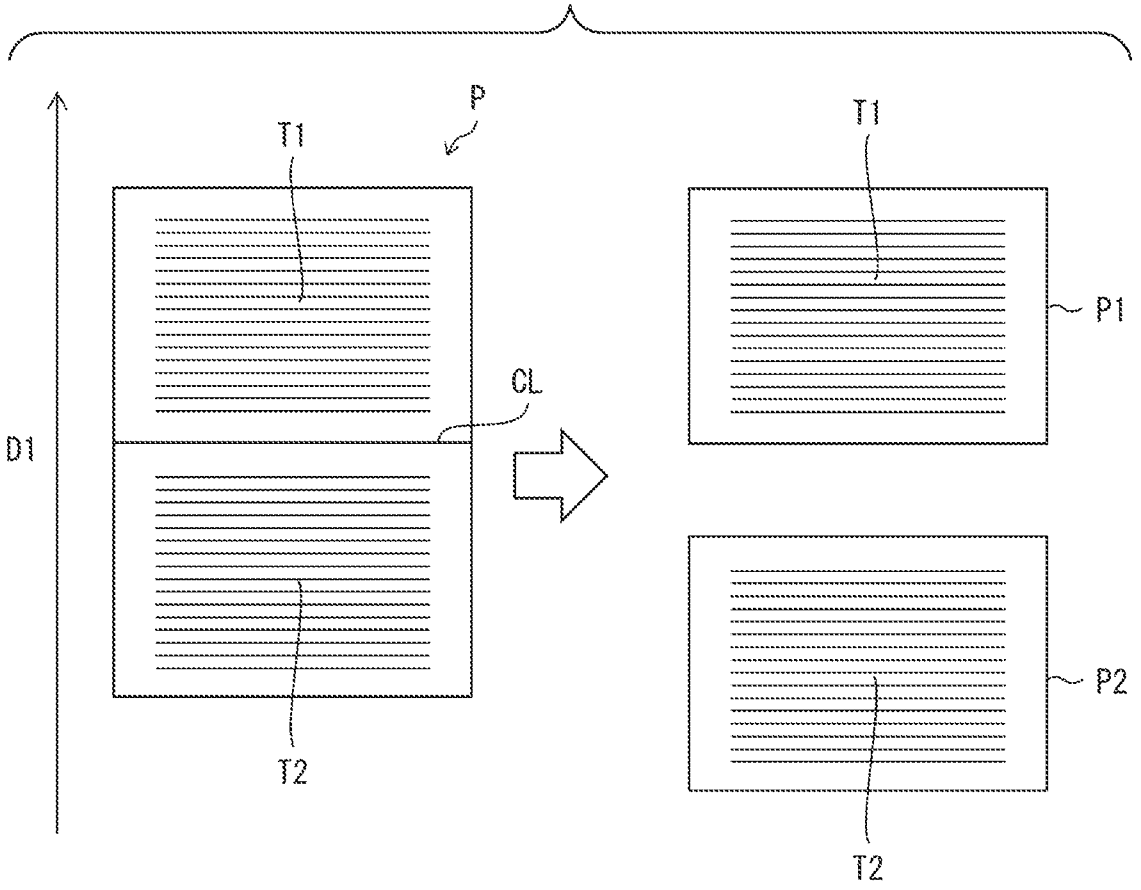
FIG. 4 is a diagram showing a sheet before cutting and a first sheet and a second sheet after the cutting.

The cutter 10 is a known cutter mechanism, includes a pair of upper and lower blades and a cutter carriage, and cuts the sheet P by the upper and lower blades. Specifically, the cutter 10 cuts a predetermined position of the sheet P in the width direction by moving the cutter carriage in the width direction of the sheet P. As shown in FIG. 4, the cutter 10 cuts the sheet P to divide the sheet P into the first sheet P1 and the second sheet P2. The first sheet P1 is an example of a first print medium of the present disclosure. The second sheet P2 is an example of a second print medium of the present disclosure. The cutter 10 may include only one of the upper and lower blades.

The conveyance roller 66 is disposed downstream of the cutter 10 in the first conveyance direction D1 in the first conveyance path R1. A spur roller 67 is disposed at a position facing an upper portion of the conveyance roller 66. The conveyance roller 66 is driven by the conveyance motor 108 (see FIG. 3). The spur roller 67 rotates in accordance with rotation of the conveyance roller 66. When the conveyance roller 66 and the spur roller 67 rotate forward, the sheet P, the first sheet P1, and the second sheet P2 are conveyed by the conveyance roller 66 and discharged to the discharge tray 22.

As shown in FIG. 2, the second flap 48 is rotatably disposed at a merging position W of the first conveyance path R1 and the second conveyance path R2. Specifically, the second flap 48 is rotatable between a first state indicated by a solid line in FIG. 2 and a second state indicated by a dotted line in FIG. 2. When the second flap 48 is in the first state, a part of the second conveyance path R2 is configured by the second flap 48 and the guide member 42. Further, when the second flap 48 is in the second state, a part of the first conveyance path R1 is configured by the second flap 48 and the guide member 41.

A registration sensor 120 is provided upstream of the conveyance roller 60 in the first conveyance path R1. The registration sensor 120 detects that a leading end or a trailing end of the sheet P passes through a contact position with the conveyance roller 60. As the registration sensor 120, a sensor including an actuator that swings when the sheet P comes into contact with the actuator, an optical sensor, or the like can be used.

The registration sensor 120 outputs an ON signal in a state where the sheet P passes through a position of the registration sensor 120, and outputs an OFF signal in a state where the sheet P does not pass through the position of the registration sensor 120. That is, the ON signal is output from a timing at which the leading end of the sheet P reaches the position of the registration sensor 120 until the trailing end of the sheet P passes through the position of the registration sensor 120, and the OFF signal is output during the other period. A detection signal from the registration sensor 120 is output to the controller 100.

The conveyance roller 60 is provided with a rotary encoder 121 that detects the rotation of the conveyance roller 60. The rotary encoder 121 outputs a pulse signal to the controller 100 in accordance with the rotation of the conveyance roller 60 (see FIG. 3). The rotary encoder 121 includes an encoder disk and an optical sensor. The encoder disk rotates together with the conveyance roller 60. The optical sensor reads the rotating encoder disk to generate the pulse signal, and outputs the generated pulse signal to the controller 100.

The second conveyance path R2 is a path defined by guide members 71, 72, and 73, the conveyance roller 68, a pinch roller 69, and the like. The first conveyance path R1 branches from the branching position Y upstream of the conveyance roller 64 in the first conveyance path R1, and the second conveyance path R2 is connected to the first conveyance path R1 at the merging position W upstream of the image recording device 3 in the first conveyance direction D1 in the first conveyance path R1. Accordingly, images can be recorded on both surfaces of the sheet P in image recording processing (S4) to be described later.

Electrical Configuration of Printing Apparatus

Figure 3:
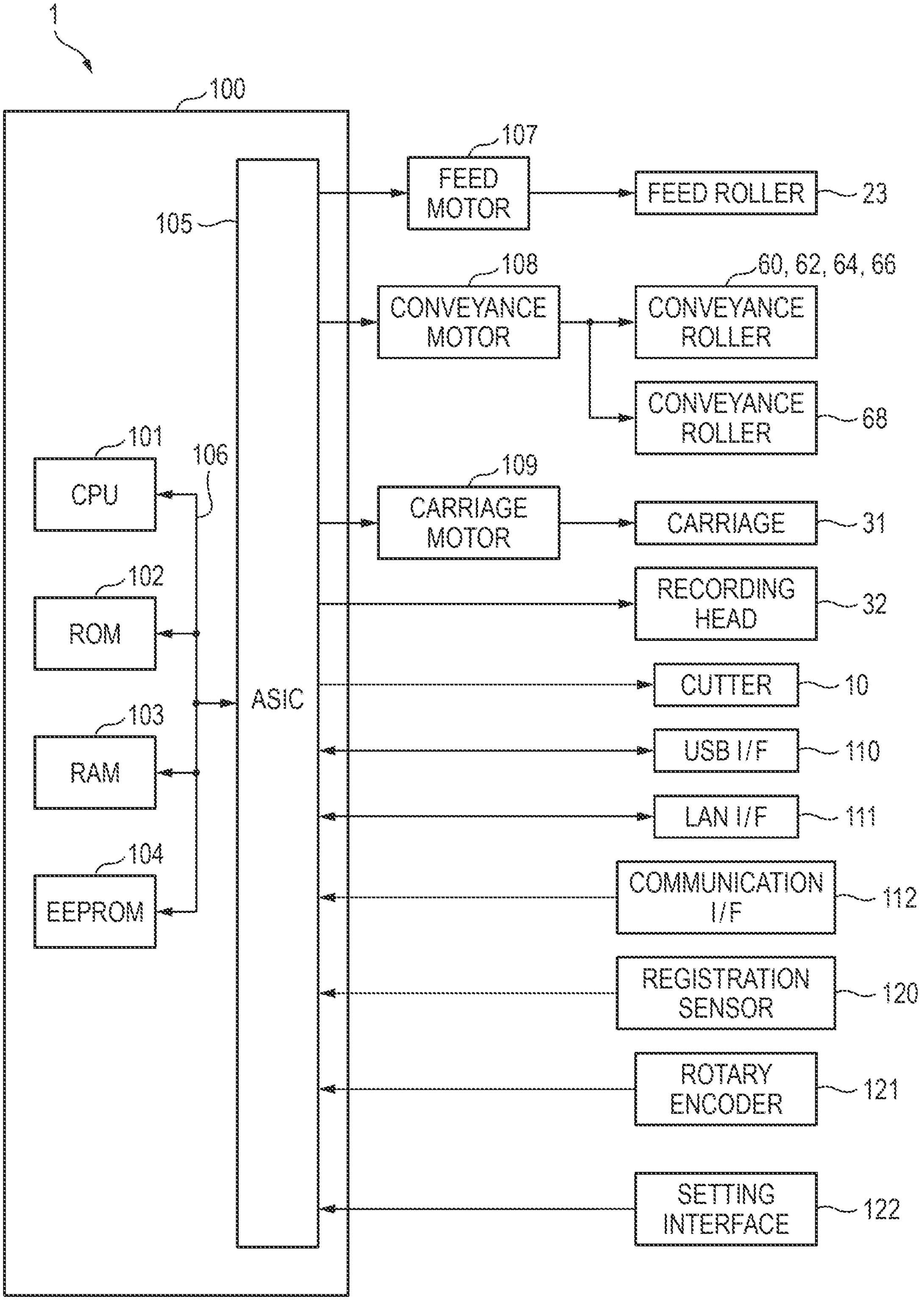
FIG. 3 is a block diagram showing an electrical configuration of the printing apparatus according to the present disclosure.

FIG. 3 is a block diagram showing an electrical configuration of the printing apparatus 1 according to the first illustrative embodiment. As shown in FIG. 3, in addition to the components described above, the printing apparatus 1 includes the feed motor 107, the conveyance motor 108, the carriage motor 109, the controller 100, a USB interface (I/F) 110, a LAN interface (I/F) 111, and a communication interface (I/F) 112.

The controller 100 includes a central processing unit (CPU) 101, a read only memory (ROM) 102, a random access memory (RAM) 103, an EEPROM (registered trademark) 104, and an ASIC 105 that are connected by an internal bus 106. The ROM 102 stores programs and the like for the CPU 101 to control various operations. The RAM 103 is used as a storage region for temporarily storing data, signals, and the like used when the CPU 101 executes the programs, or as a work region for data processing. The EEPROM 104 stores setting information to be stored even after power is turned off. The controller 100 controls the feed motor 107, the conveyance motor 108, the carriage motor 109, the recording head 32, the cutter 10, and the like based on the control programs read from the ROM 102.

The ASIC 105 is connected to the feed motor 107, the conveyance motor 108, the carriage motor 109, the recording head 32, the cutter 10, the USB interface (I/F) 110, the LAN interface (I/F) 111, the communication interface (I/F) 112, the registration sensor 120, the rotary encoder 121, and the setting interface 122. The ASIC 105 supplies a drive current to the feed motor 107, the conveyance motor 108, and the carriage motor 109. The controller 100 controls the rotation of the feed motor 107, the conveyance motor 108, and the carriage motor 109 by, for example, pulse width modulation (PWM) control.

The controller 100 applies a drive voltage to a vibration element of the recording head 32 to cause the nozzles 33 to eject the ink droplets. Further, the registration sensor 120 and the rotary encoder 121 are connected to the ASIC 105. Then, the controller 100 detects a state of the printing apparatus 1 based on the signals output from the registration sensor 120 and the rotary encoder 121.

Specifically, the controller 100 detects that the sheet P passes through the contact position with the conveyance roller 60 based on a detection signal output from the registration sensor 120. The controller 100 detects a rotation amount of the conveyance roller 60 based on the pulse signal output from the rotary encoder 121. Further, the controller 100 estimates a conveyance amount of the sheet P in the first conveyance path R1 based on the pulse signal output from the rotary encoder 121 after the ON signal is output from the registration sensor 120.

A USB memory, a USB cable, and the like are connected to the USB interface (I/F) 110. A PC is connected to the LAN interface 111 via an LAN cable. The controller 100 receives the print job via the USB interface 110 or the LAN interface 111, and then records the print data designated by the print job on the sheet P by controlling each component of the printing apparatus 1.

Flow of Control by Controller

Figure 5:
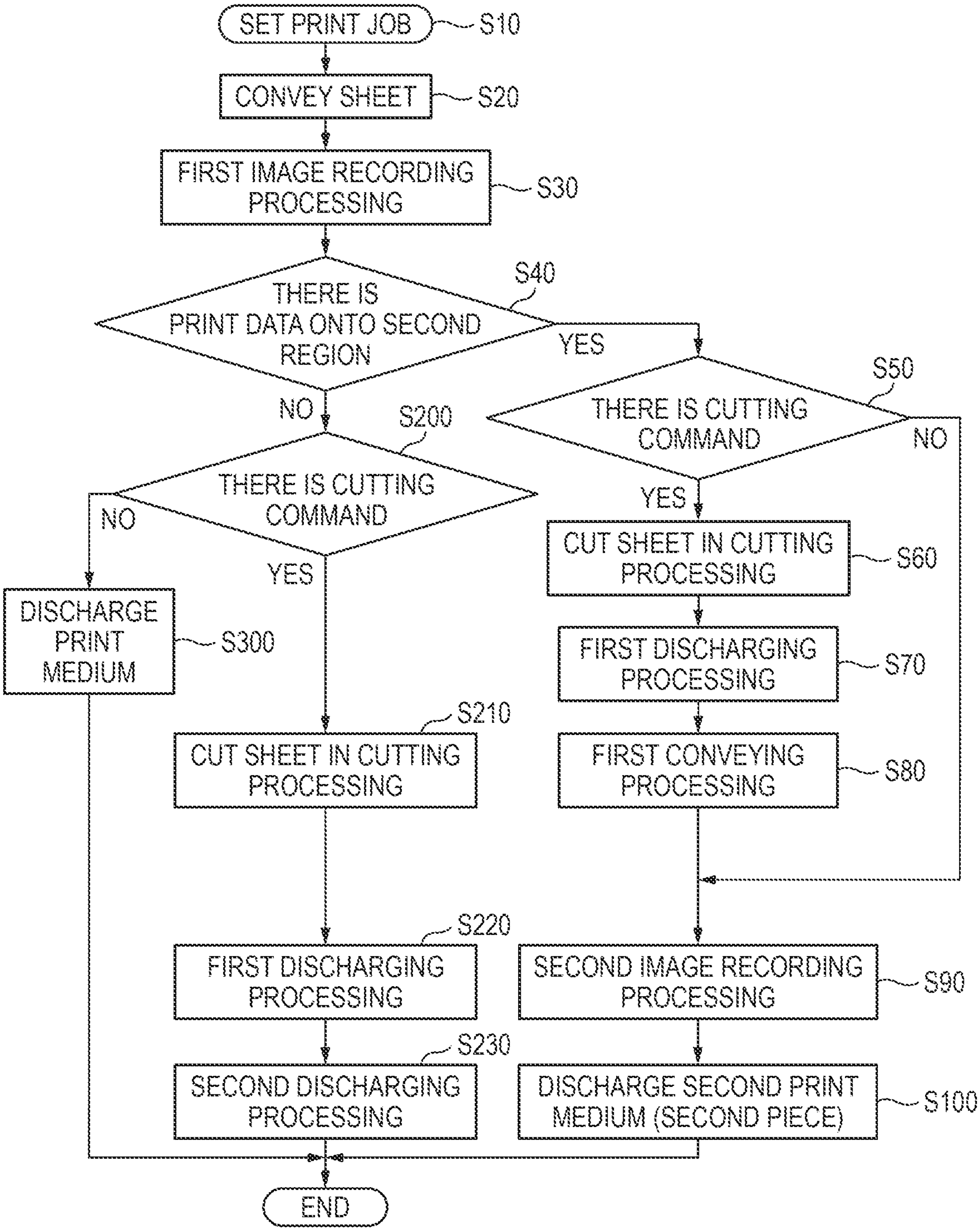
FIG. 5 is a flowchart of a flow of control by a controller of the printing apparatus according to the present disclosure.

Next, a flow of control by the controller 100 of the printing apparatus 1 will be described with reference to FIGS. 4 and 5. FIG. 4 is a diagram showing the sheet P before cutting and the first sheet P1 and the second sheet P2 after the cutting. FIG. 5 is a flowchart of the flow of the control by the controller 100 of the printing apparatus 1.

As shown in FIG. 5, in step S10, the user sets the print job using the setting interface 122. The setting of the print job includes designation of the size of the sheet P and setting of whether to cut the designated sheet P. The designation of the size of the sheet P is, for example, designation of which sheet P of A4 size or A3 size is to be used for printing.

As shown in FIG. 4, the sheet P has a first region T1 on an upstream side and a second region T2 on a downstream side in the first conveyance direction D1 with CL as a boundary. In the present illustrative embodiment, an intermediate position at which the sheet P1 and the sheet P2 of A5 size, which is a half of A4 size, are generated is referred to as the boundary CL of the sheet P (hereinafter, referred to as a boundary position CL).

The first region T1 and the second region T2 may not be predetermined regions in the sheet P, and a position of the boundary position CL of the sheet P may be changed depending on ranges of the first region T1 and the second region T2. That is, the ranges of the first region T1 and the second region T2 can be changed as appropriate depending on a size of image data formed by controlling the image recording device 3 by the controller 100.

In step S20, when the controller 100 receives the print job, the controller 100 performs conveying processing of conveying the sheet P from the feed tray 21 to the image recording device 3 along the first conveyance direction D1. Specifically, first, the controller 100 drives the feed motor 107 to rotate the feed roller 23 forward, thereby conveying the sheet P from the feeding tray 21 to the conveyance start position V of the first conveyance path R1.

Then, when a leading end of the sheet P comes into contact with the second flap 48, the second flap 48 maintained in the first state (see the solid line in FIG. 2) by its own weight is pushed by the sheet P and rotates from the first state to the second state (see the dotted line in FIG. 2). Accordingly, the second flap 48 guides the sheet P conveyed in the first conveyance direction D1 to a downstream side of the merging position W in the first conveyance direction D1 along the curved guide member 41. When a trailing end of the sheet P passes through the second flap 48, the second flap 48 rotates from the second state to the first state by its own weight.

Then, when the leading end of the sheet P reaches the conveyance roller 60, the controller 100 drives the conveyance motor 108 to rotate the conveyance rollers 60, 62, 64, and 66, thereby conveying a leading end side of the sheet P to the image recording device 3.

In step S30, the controller 100 performs first image recording processing, on the sheet P conveyed to the image recording device 3, of recording an image in the first region T1 of the sheet P by the image recording device 3. Specifically, the controller 100 controls an operation of the image recording device 3 to form the image on the first region T1 of the sheet P. That is, the first image recording processing is processing of recording the image on the first region T1 of the sheet P. The first region T1 is a region of a downstream half of the sheet P in the first conveyance direction D1. When the image is formed on the first region T1, the second region T2 is blank.

When the first image recording processing is completed, in step S40, the controller 100 determines whether there is print data onto the second region T2. When the controller 100 determines that there is the print data onto the second region T2 (S40: YES), the controller 100 determines whether there is the setting of whether to cut the sheet P in step S50.

When there is the setting to cut the sheet P (S50: YES), the controller 100 causes the sheet P to be conveyed in the first conveyance direction D1 to a position at which the boundary position CL between the first region T1 and the second region T2 of the sheet P coincides with the cutting position X.

In step S60, the controller 100 controls the cutter 10 to perform the cutting processing on the sheet P. When the sheet P is cut by the cutter 10, the sheet P is divided into the first sheet P1 and the second sheet P2 each being a half of the sheet P in size. In the present illustrative embodiment, the first sheet P1 and the second sheet P2 of A5 size are generated.

In step S70, the controller 100 causes the first sheet P1 obtained by cutting to be discharged to an outside of the printing apparatus in first discharging processing. Specifically, the controller 100 causes the conveyance roller 66 to rotate forward to convey the first sheet P1 obtained by cutting in the first conveyance direction D1. The conveyance roller 66 is driven by the conveyance motor 108 (see FIG. 3). The spur roller 67 rotates in accordance with the rotation of the conveyance roller 66. When the conveyance roller 66 and the spur roller 67 rotate forward, the first sheet P1 is nipped by the conveyance roller 66 and the spur roller 67 and discharged to the discharge tray 22.

In step S80, the controller 100 performs first conveying processing of conveying the second sheet P2 obtained by cutting in the second conveyance direction D2 opposite to the first conveyance direction D1. Specifically, the controller 100 causes the conveyance rollers 60, 62, and 64 to rotate backward to switch back the sheet P by a predetermined amount in the second conveyance direction D2 in the first conveyance path R1. The predetermined amount is a conveyance amount by which the second sheet P2 is conveyed in the second conveyance direction D2 to a position at which an image can be recorded on the second region T2 of the second sheet P2. The position at which the image can be recorded on the second region T2 of the second sheet P2 is a position at which a sheet end (cut side) of the second sheet P2 in the first conveyance direction D1 is nipped by the conveyance roller 60 and the pinch roller 61 and can be conveyed to the image recording device 3. The controller 100 causes the second sheet P2 to be conveyed by the predetermined amount in the second conveyance direction D2, and then stops the conveyance of the second sheet P2.

In step S90, the controller 100 performs second image recording processing, on the second sheet P2 conveyed to the image recording device 3, of recording the image on the second region T2 of the second sheet P2 by the image recording device 3. Specifically, the controller 100 drives the conveyance motor 108 to rotate the conveyance rollers 60, 62, 64, and 66 for the second sheet P2 located at the position at which the image can be recorded on the second region T2, thereby conveying a leading end side of the second sheet P2 to the image recording device 3. Then, the controller 100 performs the second image recording processing, on the second sheet P2 conveyed to the image recording device 3, of recording the image by the image recording device 3.

In step S100, the controller 100 discharges the second sheet P2 on which the second image recording processing is completed to the outside of the printing apparatus. Specifically, the controller 100 causes the conveyance rollers 62, 64, and 66 to rotate forward to convey the second sheet P2 in the first conveyance direction D1. The conveyance rollers 62, 64, and 66 are driven by the conveyance motor 108 (see FIG. 3). The spur rollers 63, 65, and 67 rotate in accordance with the rotation of the conveyance rollers 62, 64, and 66. When the conveyance rollers 62, 64, and 66 and the spur rollers 63, 65, and 67 rotate forward, the second sheet P2 is nipped by the conveyance rollers 62, 64, and 66 and the spur rollers 63, 65, and 67, and is discharged to the discharge tray 22. When the second sheet P2 is discharged to the discharge tray 22, the print job ends.

On the other hand, in step S40, when the controller 100 determines that there is no print data onto the second region T2 (S40: NO), the controller 100 determines whether there is the setting of whether to cut the sheet P in step S200. When there is the setting to cut the sheet P (S200: YES), the controller 100 conveys the sheet P in the first conveyance direction D1 to the position at which the boundary position CL between the first region T1 and the second region T2 of the sheet P coincides with the cutting position X.

In step S210, the controller 100 controls the cutter 10 to perform the cutting processing on the sheet P. When the sheet P is cut by the cutter 10, the sheet P is divided into the first sheet P1 and the second sheet P2 each being a half of the sheet P in size.

In step S220, the controller 100 discharges the first sheet P1 obtained by cutting to the outside of the printing apparatus in first discharging processing.

In step S230, the controller 100 performs the second discharging processing of discharging the second print medium to the outside. Specifically, the controller 100 causes the conveyance rollers 62, 64, and 66 to rotate forward to convey the second sheet P2 in the first conveyance direction D1. The conveyance rollers 62, 64, and 66 are driven by the conveyance motor 108 (see FIG. 3). The spur rollers 63, 65, and 67 rotate in accordance with the rotation of the conveyance rollers 62, 64, and 66. When the conveyance rollers 62, 64, and 66 and the spur rollers 63, 65, and 67 rotate forward, the second sheet P2 is nipped by the conveyance rollers 62, 64, and 66 and the spur rollers 63, 65, and 67, and is discharged to the discharge tray 22. When the second sheet P2 is discharged to the discharge tray 22, the print job ends.

On the other hand, when the controller 100 determines that there is no setting to cut the sheet P (S200: NO) in step S200, the controller 100 causes the sheet P to be conveyed in the first conveyance direction D1 and causes the sheet P to be discharged to the discharge tray 22 in step S300. When the sheet P is discharged to the discharge tray 22, the print job ends.

As described above, according to the first illustrative embodiment, after the first image recording processing of recording the image on the first region T1, the sheet P is cut into the first sheet P1 and the second sheet P2 by the cutter 10. The first sheet P1 after the cutting is discharged to the discharge tray 22. The second sheet P2 after the cutting is conveyed in the second conveyance direction D2 opposite to the first conveyance direction D1, and the image is recorded on the second sheet P2 by the image recording device 3. Accordingly, the first sheet P1 is discharged to the outside before the image is recorded on the second sheet P2. Further, since the image is recorded on the second region T2 after the sheet P is cut into the first sheet P1 and the second sheet P2, it is possible to prevent deviation of the sheet P due to a cutting resistance at a time of cutting which may occur in a middle of recording the image on the second region T2.

Therefore, a time required from a start of the image recording on the sheet P by the image recording device 3 to the discharging of a first sheet of the first sheet P1 of the first sheet P1 and the second sheet P2 obtained by cutting by the cutter 10 can be shortened, and the same print quality as a print quality of the first sheet P1 can be maintained for a second and subsequent sheets of the second sheet P2 of the first sheet P1 and the second sheet P2 obtained by cutting.

Further, a decrease in a misfeed rate can also be implemented. That is, by discharging the first sheet of the first sheet P1 to the discharge tray 22 first, when the first sheet P1 and the second sheet P2 are conveyed in the first conveyance direction D1 in the first conveyance path R1, interference between the first sheet P1 and the second sheet P2 is reduced. Therefore, a jam caused by interference between an upstream sheet end of the first sheet P1 in the first conveyance direction D1 and a downstream sheet end of the second sheet P2 in the first conveyance direction D1 can be prevented from occurring. Further, since the interference between the sheet ends is reduced, a discharge order of the first sheet P1 and the second sheet P2 can be prevented from being reversed.

When the controller 100 does not receive the print data for forming the image on the second region T2, the second sheet P2, which is a blank sheet, is discharged to the discharge tray 22 after the first sheet P1 is discharged to the discharge tray 22. Therefore, a speed of finishing the printing on the sheet P can be improved.

Second Illustrative Embodiment

Figure 6:
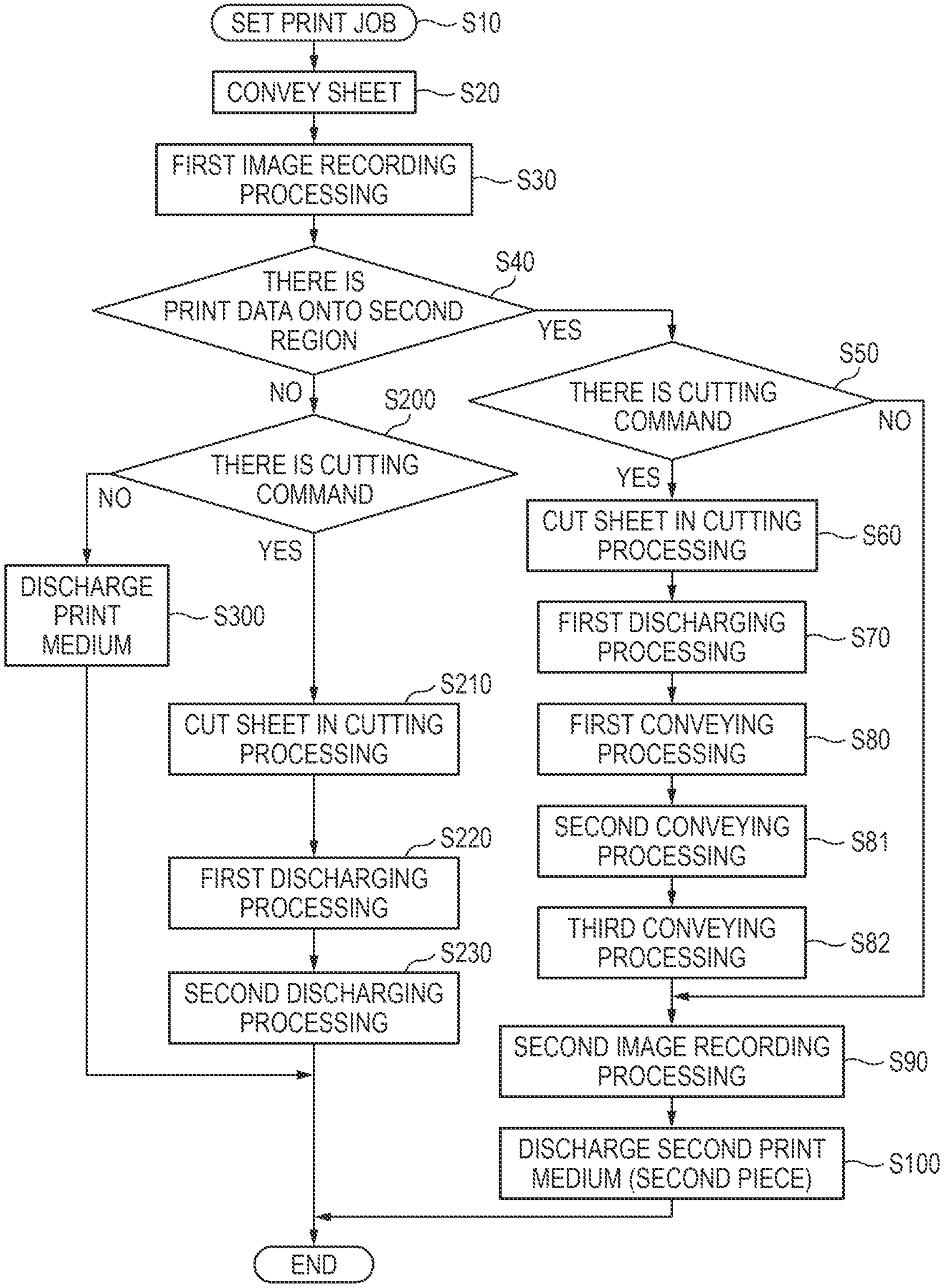
FIG. 6 is a flowchart of a flow of control by the controller of the printing apparatus according to the present disclosure.
Figure 7:
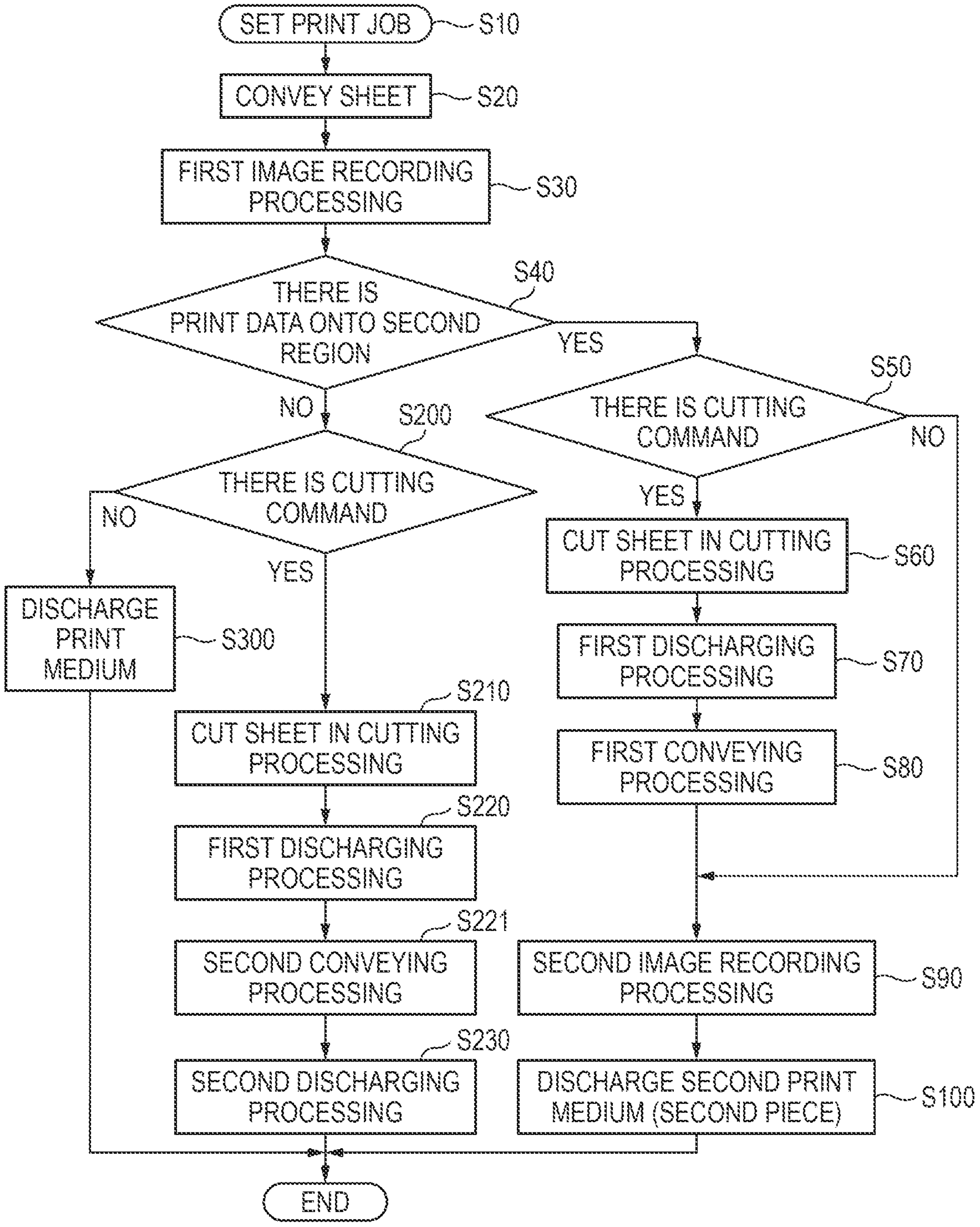
FIG. 7 is a flowchart of a flow of control by the controller of the printing apparatus according to the present disclosure.

Next, a second illustrative embodiment of control by the controller 100 of the printing apparatus 1 will be described with reference to FIGS. 6 and 7. FIGS. 6 and 7 are flowcharts of flows of the control by the controller 100 of the printing apparatus 1. As shown in FIG. 6, the second illustrative embodiment is different from the first illustrative embodiment in that processing including second conveying processing and third conveying processing is performed when there is print data onto the second sheet P2. Further, as shown in FIG. 7, the second illustrative embodiment is different from the first illustrative embodiment in that processing including the second conveying processing is performed when there is no print data onto the second sheet P2.

The same steps as those of the first illustrative embodiment shown in FIG. 5 are denoted by the same reference numerals, and the detailed description of the same steps and descriptions of the functions and effects thereof will be omitted.

In step S81, the controller 100 performs the second conveying processing of conveying the second sheet P2 to the second conveyance path R2. Specifically, the controller 100 reversely drives the conveyance motor 108 to rotate the conveyance rollers 64 and 66 backward, thereby conveying the second sheet P2 on which no image is recorded in the second conveyance direction D2 opposite to the first conveyance direction D1 in the first conveyance path R1. At this time, the first flap 46 is rotated to a first state by a biasing force of the coil spring 47.

That is, after a trailing end of the second sheet P2 passes through the first flap 46, the first flap 46 closes the first conveyance path R1 by the biasing force of the coil spring

47. Therefore, the second sheet P2 conveyed in the second conveyance direction D2 along the first conveyance path R1 is conveyed to the second conveyance path R2 along a lower surface of the first flap 46 with the trailing end of the second sheet P2 in the first conveyance direction D1 as a leading end. Then, the controller 100 conveys the sheet P from the branching position Y toward the conveyance start position V in the second conveyance path R2 by rotating the conveyance roller 68.

In step S82, the controller 100 performs the third conveying processing of conveying the second sheet P2 to the image recording device 3. Specifically, the second sheet P2 in the second conveyance path R2 is conveyed from the merging position W to the first conveyance path R1 to reverse front and back surfaces of the second sheet P2, and then the second sheet P2 is conveyed to the image recording device 3. Then, the controller 100 causes the image recording device 3 to perform second image recording processing on the back surface of the second sheet P2 (S90).

Further, in step S221, the controller 100 performs the second conveying processing of conveying a second print medium to the second conveyance path. Specifically, the controller 100 reversely drives the conveyance motor 108 to rotate the conveyance rollers 64 and 66 backward, thereby conveying the second sheet P2 on which no image is recorded in the second conveyance direction D2 opposite to the first conveyance direction D1 in the first conveyance path R1.

As described above, according to the second illustrative embodiment, the second sheet P2 is conveyed to the second conveyance path R2 with the trailing end of the second sheet P2 in the first conveyance direction D1, which is the direction opposite to a cut side of the second sheet P2, as a leading end thereof. Then, the second sheet P2 conveyed to the second conveyance path R2 is conveyed to the image recording device 3.

Accordingly, even when deviation of the second sheet P2 after the cutting due to a cutting resistance against the sheet P when the sheet P is cut occurs, the second sheet P2 is re-conveyed to the image recording device 3 via the second conveyance path R2 with the trailing end of the second sheet P2 in the first conveyance direction D1 as the leading end of the sheet.

That is, cueing processing on the second sheet P2 to the image recording device 3 is accurately performed. Therefore, since the second image recording processing on the second region T2 of the second sheet P2 can be accurately performed, a print quality before and after the cutting of the sheet P can be maintained at the same level as the print quality of the first sheet P1.

When the controller 100 does not receive the print data for forming the image on the second region T2, the second sheet P2 is conveyed to the second conveyance path R2 with the trailing end of the second sheet P2 in the first conveyance direction D1, which is the direction opposite to the cut side of the second sheet P2, as the leading end of the sheet.

Then, the second sheet P2 conveyed to the second conveyance path R2 is discharged to the discharge tray 22 in second discharging processing. Accordingly, sheet ends of the first sheet P1 discharged to the discharge tray 22 and the second sheet P2 on which the image is not recorded can be aligned on sides where cutting of the sheet is not performed.

Third Illustrative Embodiment

Figure 8:
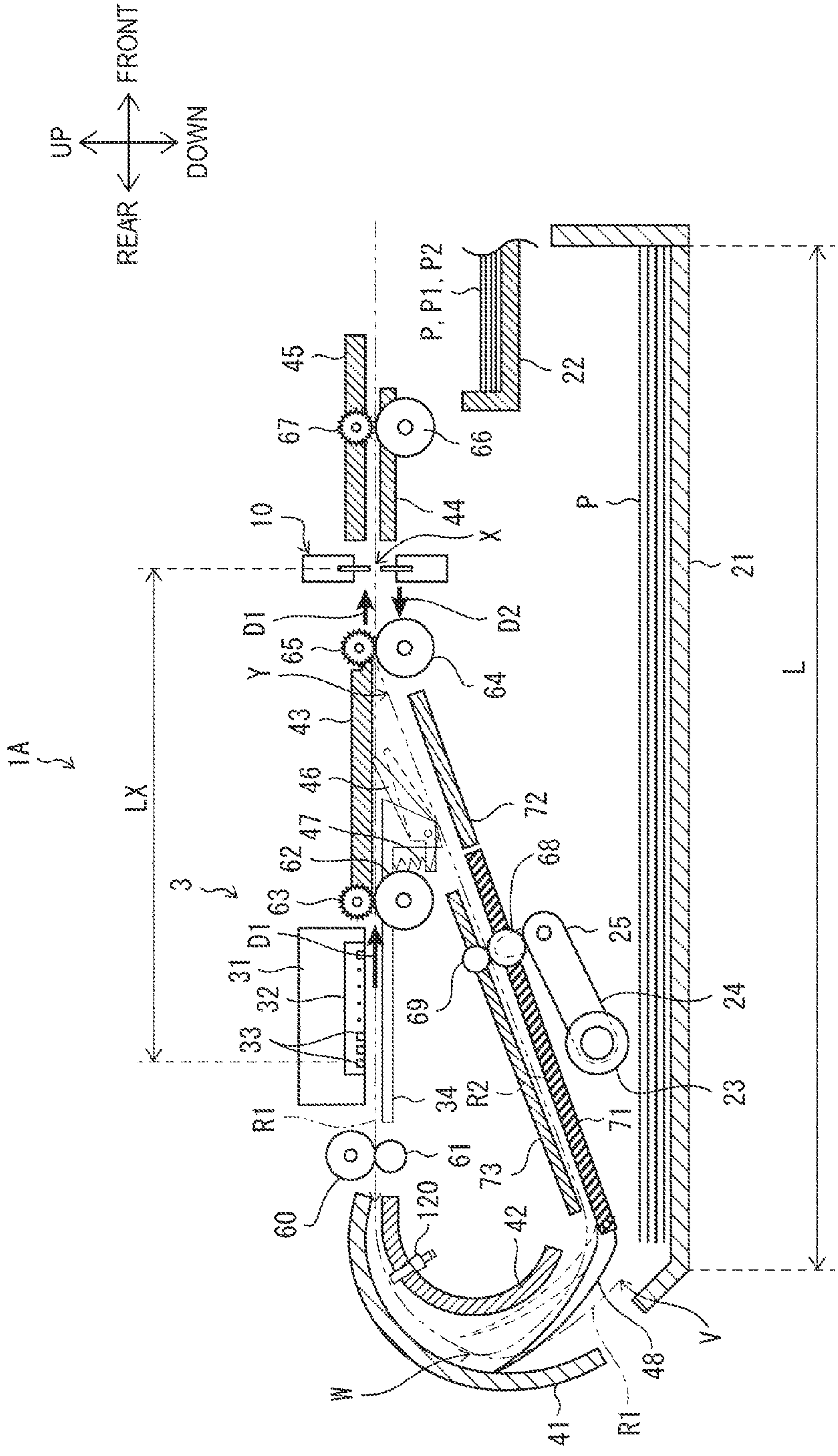
FIG. 8 is a cross-sectional view showing an internal structure of a printing apparatus according to the present disclosure.

Next, a printing apparatus 1A according to a third illustrative embodiment will be described with reference to FIG. 8. FIG. 8 is a cross-sectional view showing an internal structure of the printing apparatus 1A. As shown in FIG. 8, the printing apparatus 1A according to the third illustrative embodiment is different from the printing apparatus 1 according to the first and second illustrative embodiments in that a distance LX in the first conveyance direction D1 from the cutting position X of the cutter 10 to a position of the nozzle 33 most upstream in the first conveyance direction D1 among a plurality of nozzles 33 is shorter than a half of a length L of the accommodation portion 21 of the sheet P in the first conveyance direction D1. For convenience of description, members having the same functions as those described in the above illustrative embodiments are denoted by the same reference numerals, and descriptions thereof will not be repeated.

As shown in FIG. 8, the distance LX in the first conveyance direction D1 from the cutting position X at which the cutter 10 cuts the sheet P to the position of the nozzle 33 most upstream in the first conveyance direction D1 among the plurality of nozzles 33 is shorter than a half of the length L of the feed tray 21 in a front-rear direction. Here, the length L of the feed tray 21 in the front-rear direction refers to a length from a front inner wall surface to a rear inner wall surface of the feed tray 21.

In the printing apparatus 1A, a distance of the first conveyance path R1 is short. Therefore, the controller 100 causes the second sheet P2 to be conveyed by a predetermined amount in the first conveyance direction D1 before performing second conveying processing (steps S81 and S221) of conveying the second sheet P2 to the second conveyance path R2. Here, the predetermined amount is a conveyance amount by which the second sheet P2 is conveyed in the first conveyance direction D1 to a position at which a trailing end of the second sheet P2 passes through the first flap 46.

As described above, according to the third illustrative embodiment, the distance LX in the first conveyance direction D1 from the cutting position X at which the cutter 10 cuts the sheet P to the position of the nozzle 33 most upstream in the first conveyance direction D1 among the plurality of nozzles 33 is shorter than a half of the length L of the feed tray 21 of the sheet P in the first conveyance direction D1. Accordingly, the cutter 10 in the first conveyance direction D1 can be brought close to the image recording device 3. Therefore, a size of the printing apparatus 1A can be reduced.

The printing apparatus 1A has the internal structure including the second conveyance path R2, whereas the printing apparatus 1A may have a structure in which the second conveyance path R2 is not provided. When the second conveyance path R2 is not provided, for example, any one of the pair of conveyance rollers 62, 64, and 66 and the spur rollers 63, 65, and 67 in the printing apparatus 1 can be omitted, and the size of the printing apparatus 1A can be further reduced.

The present invention is not limited to the above-described illustrative embodiments, and various modifications can be made within the scope of the present disclosure. The technical scope of the present invention also includes illustrative embodiments obtained by appropriately combining technical means disclosed in the different illustrative embodiments.

As discussed above, the present disclosure may provide at least the following illustrative, non-limiting aspects.

A printing apparatus may include: a conveyor configured to convey a print medium; a first conveyance path, the conveyor being configured to convey the print medium through the first conveyance path in a first conveyance direction; an image recording device provided in the first conveyance path, the image recording device being configured to record an image on the print medium; a cutter provided downstream of the image recording device in the first conveyance path, the cutter being configured to cut the print medium into a first print medium and a second print medium at a predetermined cutting position, the first print medium having a first region, the second print medium having a second region; and a controller. The controller may be configured to perform processing including: first image recording processing of recording an image in the first region by the image recording device; after the first image recording processing, cutting processing of cutting the print medium into the first print medium and the second print medium by the cutter; after the cutting processing, first discharging processing of discharging the first print medium to an outside; after the first discharging processing, first conveying processing of conveying the second print medium in a second conveyance direction by the conveyor, the second conveyance direction being opposite to the first conveyance direction; and after the first conveying processing, second image recording processing of recording an image in the second region of the second print medium by the image recording device.

In the above configuration, after the first image recording processing of recording the image in the first region, the print medium is cut into the first print medium and the second print medium by the cutter. The first print medium after the cutting is discharged to the outside. Then, the second print medium after the cutting is conveyed in the second conveyance direction opposite to the first conveyance direction, and the image is recorded on the second print medium by the image recording device. Accordingly, the first print medium is discharged to the outside before the image is recorded on the second print medium.

In addition, since the image is recorded in the second region after the print medium is cut into the first print medium and the second print medium, it is possible to prevent deviation of the print medium due to a cutting resistance at a time of cutting which may occur in a middle of recording the image on the second region.

Therefore, the time required from when the image is started to be recorded on the print medium in the image recording device to when the first sheet of the print medium among print media obtained by being cut by the cutter is discharged can be shorted, and the same print quality as the print quality of the first sheet of the print medium can be maintained for the second and subsequent print media among the print media obtained by the cutting.

The printing apparatus may further include: a second conveyance path, the conveyor being configured to convey the second print medium through the second conveyance path in the second conveyance direction with a trailing end of the second print medium in the first conveyance direction as a leading end. The controller may be configured to perform processing including: after the first discharging processing, second conveying processing of conveying the second print medium to the second conveyance path; and after the second conveying processing, third conveying processing of conveying the second print medium to the image recording device.

According to the above configuration, the second print medium is conveyed to the second conveyance path with the trailing end of the sheet in the first conveyance direction, which is the direction opposite to a cut side of the second print medium, as the leading end of the sheet. Then, the second print medium conveyed to the second conveyance path is conveyed to the image recording device. Accordingly, even when deviation of the second print medium after the cutting due to a cutting resistance against the print medium when the print medium is cut occurs, the second print medium is re-conveyed to the image recording device via the second conveyance path with the trailing end of the sheet in the first conveyance direction as the leading end of the sheet. That is, cueing processing on the second print medium to the image recording device is accurately performed. Therefore, since the second image recording processing on the second region of the second print medium can be accurately performed, a print quality before and after the cutting of the print medium can be maintained at the same level as the print quality of the first print medium.

In the printing apparatus, the controller may be configured to perform: in a case the controller does not receive print data for forming the image in the second region, after the first discharging processing of discharging the first print medium to the outside, the second conveying processing of conveying the second print medium to the second conveyance path, and then perform second discharging processing.

According to the above configuration, when the controller does not receive the print data for forming the image on the second region, the second print medium is conveyed to the second conveyance path with the trailing end of the sheet in the first conveyance direction, which is the direction opposite to the cut side of the second print medium, as the leading end of the sheet. Then, the second print medium conveyed to the second conveyance path is discharged to the outside in the second discharging processing. Accordingly, sheet ends of the first print medium discharged to the outside and the second print medium on which the image is not recorded can be aligned on sides where the cutting of the sheet is not performed.

In the printing apparatus, the controller may be configured to perform: in the case the controller does not receive the print data for forming the image in the second region, after the first discharging processing of discharging the first print medium to the outside, the second discharging processing of discharging the second print medium to the outside.

According to the above configuration, when the controller does not receive the print data for forming the image on the second region, the second print medium is discharged to the outside after the first print medium is discharged to the outside. Therefore, a speed of finishing printing on the print medium can be improved.

The printing apparatus may further include an accommodation portion configured to accommodate the print medium. The image recording device may include a recording head having a plurality of nozzles. A distance in the first conveyance direction from the cutting position of the cutter to a position of a nozzle most upstream in the first conveyance direction among the plurality of nozzles may be shorter than a half of a length of the accommodating portion of the print medium in the first conveyance direction.

According to the above configuration, the distance in the first conveyance direction from the cutting position at which the cutter cuts the print medium to the position of the nozzle most upstream in the first conveyance direction among the plurality of nozzles is shorter than a half of the length of the accommodation portion of the print medium in the first conveyance direction. Accordingly, the cutter in the first conveyance direction can be brought close to the image recording device. Therefore, the size of the printing apparatus can be reduced.

What is claimed is:

1. A printing apparatus comprising:

a conveyor configured to convey a print medium;

a feed tray configured to store a plurality of print media;

a first conveyance path, the conveyor being configured to convey the print medium through the first conveyance path in a first conveyance direction;

a feed roller configured to feed the print medium accommodated in the feed tray, one by one, to the first conveyance path;

an image recording device provided in the first conveyance path, the image recording device being configured to record an image on the print medium;

a cutter provided downstream of the image recording device in the first conveyance path, the cutter being configured to cut the print medium into a first print medium and a second print medium at a predetermined cutting position, the first print medium having a first region, the second print medium having a second region; and a controller configured to cause the printing apparatus to:

record an image in the first region by the image recording device;

after the recording, cut the print medium into the first print medium and the second print medium by the cutter;

after the cutting, discharge the first print medium to an outside;

after the discharging, convey the second print medium in a second conveyance direction by the conveyor, the second conveyance direction being opposite to the first conveyance direction; and after the conveying, record an image in the second region of the second print medium by the image recording device.

2. The printing apparatus according to claim 1, further comprising:

a second conveyance path, the conveyor being configured to convey the second print medium through the second conveyance path in the second conveyance direction with a trailing end of the second print medium in the first conveyance direction as a leading end, wherein the controller is further configured to cause the printing apparatus to:

after the discharging, convey the second print medium to the second conveyance path; and after the conveying of the second print medium, convey the second print medium to the image recording device.

3. The printing apparatus according to claim 2, wherein the controller is further configured to cause the printing apparatus to:

in a case print data for forming the image in the second region is not received, after the discharging of the first print medium, discharge the second print medium to the outside.

4. The printing apparatus according to claim 3, wherein in the discharging of the second print medium, the controller is configured to further cause the printing apparatus to:

in the case the print data for forming the image in the second region is not received, after the discharging of the first print medium, convey the second print medium to the second conveyance path and then discharge the second print medium.

5. The printing apparatus according to claim 2, wherein in the conveying of the second print medium after the discharging of the first print medium, the controller is configured to further cause the printing apparatus to:

convey the second print medium in the second conveyance direction to the second conveyance path with a trailing end of the second print medium in the first conveyance direction as a leading end; and convey the second print medium to a merging position of the second conveyance path and the first conveyance path by the conveyor to reverse a front surface and a back surface of the second print medium, the merging position being positioned upstream of the image recording device in the first conveyance direction, and wherein in the recording of the image in the second region of the second print medium, the controller is configured to further cause the printing apparatus to:

record the image in the back surface of the second print medium by the image recording device.

6. The printing apparatus according to claim 2, further comprising:

a flap disposed downstream of the image recording device in the first conveyance direction at the vicinity of a branching position of the first conveyance path and the second conveyance path, the flap being configured to move between a first state closing the first conveyance path and a second state opening the first conveyance path, the flap being configured to:

move to the first state by being biased by a bias member; and move from the first state to the second state by being pushed by the print medium passing through the flap in the first conveyance direction, wherein in the conveying of the second print medium after the discharging of the first print medium, the controller is configured to further cause the printing apparatus to:

guide the second print medium conveyed in the second conveyance direction to the second conveyance path by the flap being in the first state.

7. The printing apparatus according to claim 1, further comprising:

an accommodation portion configured to accommodate the print medium, wherein the image recording device comprises a recording head having a plurality of nozzles, and wherein a distance in the first conveyance direction from the cutting position of the cutter to a position of a nozzle most upstream in the first conveyance direction among the plurality of nozzles is shorter than a half of a length of the accommodation portion of the print medium in the first conveyance direction.

8. The printing apparatus according to claim 1, wherein the conveyor comprises:

a first roller pair provided on the first conveyance path at a position upstream of the image recording device in the first conveyance direction; and a second roller pair provided downstream of the image recording device in the first conveyance direction, and wherein in the conveying of the second print medium after the discharging of the first print medium, the controller is configured to further cause the printing apparatus to:

convey the second print medium in the first conveyance path in the second conveyance direction by at least one of the second roller pair or the first roller pair to a position at which a leading end portion of the second print medium in the first conveyance direction is nipped by the first roller pair.

* * * * *